Patented May 28, 1929.

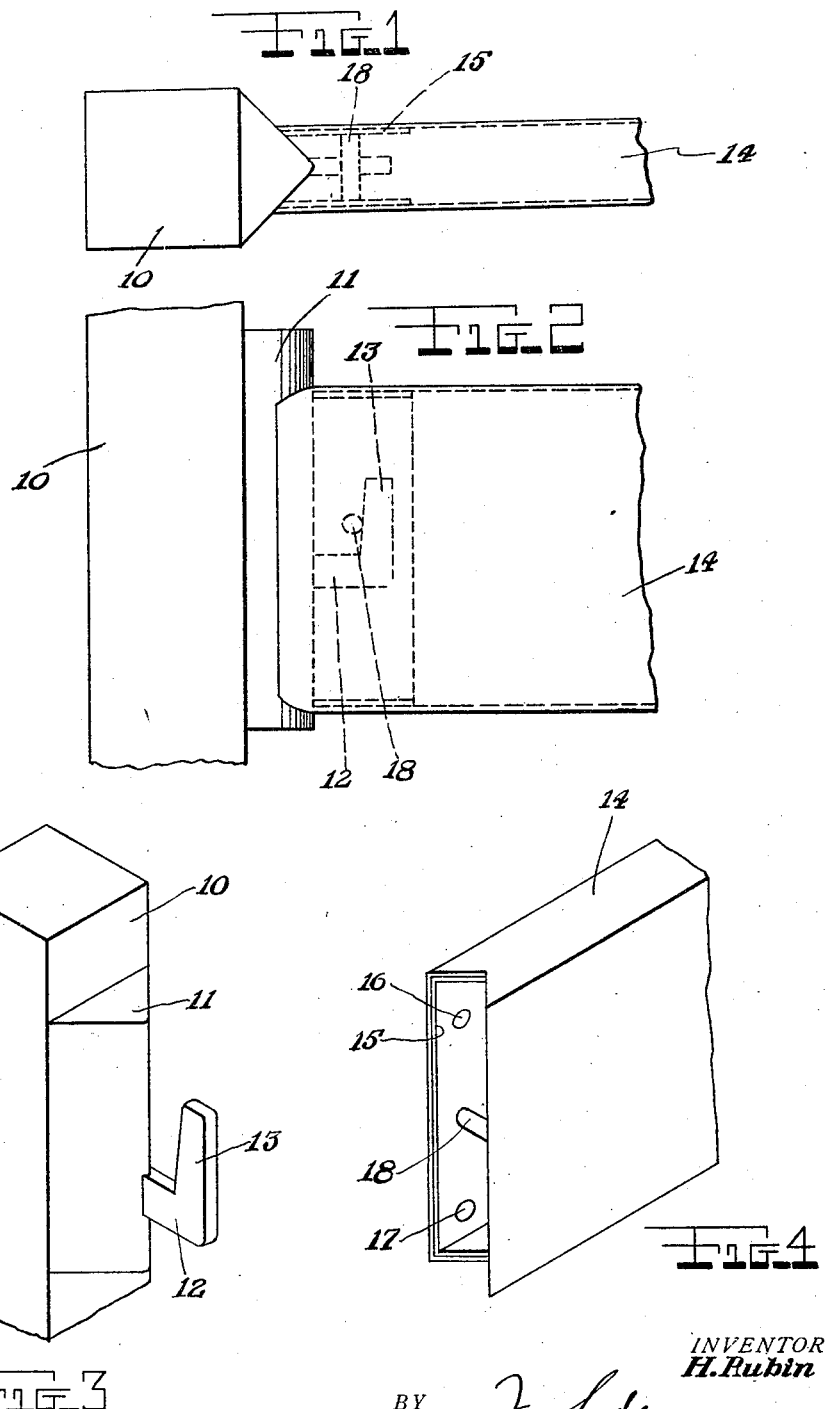

1,715,342

UNITED STATES PATENT OFFICE.

HARRY RUBIN, OF BROOKLYN, NEW YORK.

BEDSTEAD.

Application filed December 30, 1927. Serial No. 243,505.

The main object of this invention is to provide a joint particularly adapted for use in bed steads and is constructed so that the parts of the joint may be readily engaged by one another in a quick and convenient manner.

Another object of this invention is to provide a joint for the use of bed steads and consists of a hook which engages a cage in a complemental member which is provided with a pin adapted to engage the hook and secure the two complemental members to each other in a quick and ready manner without the use of any tools or other accessories.

The above and other objects will become apparent in the description below in which characters of reference refer to like-named parts in the drawing.

Referring briefly to the drawing, Figure 1 is a top plan view of a bed post and board coupled together.

Figure 2 is a side elevational view of Figure 1 showing the hook engaging the pin.

Figure 3 is a perspective view of the bed post showing the hook projecting therefrom.

Figure 4 is a perspective view of the portion of the frame of the bed stead showing the position of the cage.

Referring in detail to the drawing, the numeral 10 indicates a common type of bedpost which may be square in cross section or of any other shape desired. One of the vertical faces of the bed post 10 has a triangular guide lug 11 formed thereon. This triangular lug is formed in the shape of a V and its two sides converge toward each other. At the edge where the two side walls intersect an arm 12 projects outwardly and rising from the end of the arm is a tapering finger 13. The arm and the finger form a hook which is adapted to engage a complemental member.

The frame of the bed stead consists of longitudinal members such as is indicated by the numeral 14. The top and bottom of this tubular member 14 at its ends has triangular cut-out portions formed therein in which is received the guide lug 11 of the bed post. An elongated cage 15 is received within the ends of the tubular members of the bed stead and is rigidly held in position therein by the rivets 16 and 17. Centrally in the cage a stud 18 is anchored and is adapted to be engaged by the hook which is mounted on the bed post.

The bed post and the tubular members are adapted to be joined in a quick and convenient manner by the construction presented. The tapering side of the upright member 13 is adapted to engage the stud 18 of the cage when the hook member is telescoped into the cage. The tapering side of the member 13 acts as a wedge surface and urges the lug 11 on the bedpost to register in the cut-out portions of the tubular members and causes this lug to seat therein.

It is to be noted that certain changes in form and construction may be made without departing from the spirit and scope of the invention.

I claim:

1. A joint for bed steads comprising a post, a triangular lug on said post having converging sides, a hook projecting from said post, said hook having an inclined side, a tubular member, an inclined finger on said hook, a cage in said tubular member fixed therein, said lug serving as a jam surface for said tubular member, and a stud anchored in said cage adapted to engage the finger to secure the post and tubular member together.

2. A joint for bed steads comprising a post, a triangular lug on said post having converging sides, a hook member projecting from the intersection of the converging sides, said hook member having an inclined side, a tubular member, a cage in said tubular member fixed therein, and a stud anchored in said cage adapted to engage the inclined side of the hook member to secure the post and tubular member together.

3. A joint for bed steads comprising a post, a triangular lug on said post having converging sides, a hook member projecting from the intersection of the converging sides, said hook member having an inclined side, a tubular member, a cage in said tubular member said cage and tubular member having triangular cut-out portions adapted to receive the lug of the guide post, and a stud anchored in said cage adapted to engage the inclined side of the hook member to secure the post and tubular member together.

In testimony whereof I affix my signature.

HARRY RUBIN.